United States Patent
Asano et al.

(10) Patent No.: US 8,393,842 B2
(45) Date of Patent: Mar. 12, 2013

(54) STRIP OF METALLIC FASTENERS ADHERED TO EACH OTHER

(75) Inventors: Kunihiko Asano, Saitama (JP); Kunihiro Onishi, Saitama (JP); Ryo Koike, Tokyo (JP); Ichinari Nakamura, Tokyo (JP)

(73) Assignees: Konishi Co., Ltd., Osaka (JP); Max Co., Ltd., Tokyo (JP)

( * ) Notice: Subject to any disclaimer, the term of this patent is extended or adjusted under 35 U.S.C. 154(b) by 494 days.

(21) Appl. No.: 12/592,253

(22) Filed: Nov. 19, 2009

(65) Prior Publication Data

US 2011/0116896 A1    May 19, 2011

(51) Int. Cl.
*F16B 15/08*    (2006.01)

(52) U.S. Cl. ....... 411/442; 411/82.2; 411/443; 411/457; 411/478; 411/920

(58) Field of Classification Search ............... 411/82.2, 411/82.3, 442, 457, 477–478, 920
See application file for complete search history.

(56) References Cited

U.S. PATENT DOCUMENTS

| | | | | |
|---|---|---|---|---|
| 1,792,235 A | * | 2/1931 | Maynard | 206/340 |
| 2,522,656 A | * | 9/1950 | Whalen | 59/77 |
| 3,563,372 A | | 2/1971 | Baum et al. | |
| 3,644,252 A | * | 2/1972 | Shenfeld et al. | 524/522 |
| 3,853,606 A | * | 12/1974 | Parkinson | 428/461 |
| 3,932,327 A | * | 1/1976 | Naylor | 524/271 |
| 4,206,264 A | * | 6/1980 | Kurr | 428/458 |
| 5,441,373 A | * | 8/1995 | Kish et al. | 411/442 |
| 5,753,727 A | * | 5/1998 | Sato et al. | 523/438 |
| 2007/0142507 A1 | * | 6/2007 | Huybrechts et al. | 524/69 |
| 2008/0317563 A1 | | 12/2008 | Shida et al. | |

FOREIGN PATENT DOCUMENTS

| | | |
|---|---|---|
| EP | 0 385 227 A2 | 9/1990 |
| EP | 0 823 563 A1 | 2/1998 |
| JP | 10-29383 A | 2/1998 |
| JP | 10-029384 A | 2/1998 |
| JP | 2003-090313 A | 3/2003 |
| WO | WO 2009/145029 | 12/2009 |

* cited by examiner

*Primary Examiner* — Roberta Delisle (74) *Attorney, Agent, or Firm* — Holtz, Holtz, Goodman & Chick, P.C.

(57) ABSTRACT

A strip of metallic fasteners in which a plurality of metallic fastener materials are aligned and adhered to each other, wherein a coating agent for adhering adjacent metallic fastener materials to each other includes 100 parts by weight of an acid group-containing styrene-butadiene base rubber and 10 to 100 parts by weight of a resin having a softening point of 120° C. or more, both being dissolved by an organic solvent. The strip of metallic fasteners are adhered to each other by a coating that does not contain a halogen compound. The strip of metallic fasteners has improved blocking resistance.

10 Claims, 2 Drawing Sheets

a) BLOCK DIAGRAM (b)

b) BLOCK DIAGRAM

STRIP OF METALLIC FASTENERS ADHERED TO EACH OTHER

TECHNICAL FIELD

The present invention relates to a strip of metallic fasteners adhered to each other using a coating agent which comprises an acid group-containing styrene-butadiene base rubber, a resin having a specific softening-point, and an organic solvent, and since the coating agent contains no halogen or a compound thereof as an essential component, it is possible to provide a strip of metallic fasteners adhered to each other with less environmental load by adhering various metallic fastener materials to each other with this coating agent.

BACKGROUND ART

A metallic staple acts as a needle to fasten a plurality of papers together or a plurality of structural members together, and is largely classified into stationery staples used in general households, offices, and the like; industrial staples used for houses, furniture, and the like; and sealing staples used for various corrugated cardboard boxes and the like. A device which punches out staples one by one from a strip of a predetermined number of metallic materials (staples) adhered to each other in order to bond targets together, is called a stapler. Furthermore, pin nails or finish nails which are metallic nails, are used as nails to fix a decorative board such as an acoustic board as a ceiling finishing material to the ceiling. The device using such pin nails or finish nails are called a tacker, and there are those which have manual-type, electric-type, and air-type driving sources. In the present application, these pin nails and finish nails as well as the aforementioned staples are collectively called fasteners. While the description below is of the conventional art of staples for the sake of convenience, the description also applies to the conventional art of pin nails and finish nails.

The coating agent for metallic staples needs to have a holding force to hold a predetermined number of staples in a bonded state until they are housed in a stapler, as well as a flexibility so that each staple does not easily separate off during handling. On the other hand, when fastening targets with a stapler, it is necessary that only one staple to be punched out is easily separated from a strip of staples. Furthermore, the coating agent needs to be excellent in blocking resistance so that during production or market distribution of staples on which the coating agent is applied, the surfaces of the strips of staples do not stick on to each other when they contact with each other.

In order to satisfy the aforementioned conflicting requirements, a solvent-type rubber-base adhesive is mainly used currently as a coating agent. As a typical solvent-type rubber-base adhesive used for metallic staples, commonly used are those in which nitrile rubber and vinyl chloride or vinyl chloride-vinyl acetate copolymerized resin are formulated in addition to an organic solvent as a solvent. However, there is no conventional solvent-type rubber-base adhesive which completely satisfies the aforementioned required performance, and, in particular, when the performance as a staple is emphasized, in order to improve blocking resistance, another lacquer-base coating agent making a hard coating film needs to be coated on top of an ordinary coating agent, or the amount of coating needs to be strictly controlled, which has caused the problem of low productivity.

Another large problem in conventional solvent-type rubber-base adhesives is that vinyl chloride (vinyl chloride resin), one of their components reportedly has a possibility of generating dioxins which are harmful to humans or environment when burnt at a low temperature (850° C. or less). The same concerns remain even with commonly-used copolymerized products of vinyl chloride and vinyl acetate, i.e., vinyl chloride-vinyl acetate copolymerized resins.

Under such circumstances, provision of a coating agent for metallic staples which requires no halogen-containing compound such as vinyl chloride resin without compromising the performance is now being demanded. In response to such required performance, as a coating agent containing no vinyl chloride resin, there is known, for example, a urethane-base hot-melt adhesive (Patent Document 1) and an acrylic resin base adhesive (Patent Document 2). No coating agent, however, has been provided yet which has the flexibility of bonding metallic materials together, while not letting them easily fracture during handling, as well as a proper degree of shearing force which enables separation one by one of such bonded metallic materials by a stapler, both of which are required of staples.

[Patent Document 1] Japanese Laid-open Patent [Kokai] Publication No. Hei 10-29384 (1998)
[Patent Document 2] Japanese Laid-open Patent [Kokai] Publication No. 2003-90313

DISCLOSURE OF THE INVENTION

Object to be Achieved by the Invention

An object of the present invention is to provide a strip of metallic fasteners using a coating agent for metallic fasteners that needs no halogenated substance, as represented by vinyl chloride resin, at all, achieves performance equivalent to or better than that of a conventional coating agent for metallic fasteners, and has an improved blocking resistance, which used to be insufficient with the conventional products, whereby helping productivity to increase.

Means for Achieving the Object

The present invention is as follows:
(1) A strip of fasteners adhered to each other in which a plurality of metallic fastener materials are aligned, wherein a coating agent for adhering adjacent metallic fastener materials to each other comprises 100 parts by weight of an acid group-containing styrene-butadiene base rubber and 10 to 100 parts by weight of a resin having a softening point of 120° C. or more, both being dissolved in an organic solvent.
(2) The strip of fasteners adhered to each other according to (1), wherein the resin in the coating agent having a softening point of 120° C. or more is a copolymerized resin of an aromatic hydrocarbon and an aliphatic hydrocarbon.
(3) The strip of fasteners adhered to each other according to (1), wherein the coating agent has a numerical value in the staple shearing test of 10 to 40 N.
(4) The strip of fasteners adhered to each other according to (1), wherein the coating agent has a numerical value in the blocking test of 50 N or less.
(5) The strip of fasteners adhered to each other according to (1), wherein the coating agent contains no halogen or halogen compound.
(6) The strip of fasteners adhered to each other according to (1), which is a strip of staples adhered to each other.
(7) The strip of fasteners adhered to each other according to (1), which is a strip of staples adhered to each other used for a stationary stapler.

Effect of the Invention

The coating agent used in the strip of metallic fasteners adhered to each other of the present invention needs no halogenated substance, as represented by vinyl chloride resin, at all, and achieves performances equivalent to or better than those of coating agents for conventional fasteners. Furthermore, the strip of metallic fasteners adhered to each other of the present invention has an improved blocking resistance which used to be insufficient with conventional products. Therefore, according to the present invention, the productivity of fasteners can be improved, and the load on environment can be reduced.

BEST MODE FOR CARRYING OUT THE INVENTION

The present invention is a strip of metallic fasteners adhered to each other in which a plurality of metallic fastener materials are aligned, in which adjacent metallic fastener materials are adhered to each other by a coating agent. The strip of metallic fasteners adhered to each other include stationery fasteners, industrial fasteners, and sealing fasteners, and stationery fasteners being preferred. Furthermore, the present invention is particularly suitably used for a strip of staples among those fasteners. In the present invention, the coating agent adheres individual metallic fastener materials to each other, and also coats the whole strip of fasteners or a part thereof.

The coating agent in the present invention contains a styrene-butadiene base rubber containing an acid group, a resin having a softening point of 120° C. or more, and an organic solvent.

The acid group-containing styrene-butadiene base rubber in the present invention is an addition product of maleic anhydride or the like with a copolymer of a styrene derivative and butadiene, and an addition product of maleic anhydride or the like with a hydrogenated copolymer of styrene and butadiene. The maleic anhydride addition products of a hydrogenated copolymer of styrene and butadiene are commercially available from Asahi Kasei Corporation under the trade name of Taftech M1911, M1913, and M1943.

By containing an acid group, adhesion between metallic materials increases. While the acid value of the acid group is not particularly specified in the present invention, it is preferably 5 to 15, in particular, about 10, because when the acid value is low, a high adhesion effect on metallic materials cannot be achieved, and when the acid value is high, viscosity stability of the resultant coating agent is poor.

Furthermore, while the ratio of styrene in the styrene-butadiene base rubber containing an acid group is not particularly specified in the present invention, it is preferably 20 to 40% by weight, particularly 30% by weight in achieving balance, because when the amount of styrene is large, the resultant coating film is hard, and when the amount of styrene is small, adhesion strength lowers.

While the resin having a softening point of 120° C. or more in the present invention is not particularly limited as long as it is a resin having a softening point of 120° C. or more, there can be mentioned, for example, a copolymer of an aromatic hydrocarbon and an aliphatic hydrocarbon, an alicyclic saturated hydrocarbon resin, a polymerized rosin ester, a hydrogenated terpene resin, an aromatic hydrocarbon resin, a rosin phenol resin, and a terpene phenol resin, preferably, a copolymer of an aromatic hydrocarbon and an aliphatic hydrocarbon, an alicyclic saturated hydrocarbon resin, a polymerized rosin ester, a hydrogenated terpene resin, an aromatic hydrocarbon resin, a rosin phenol resin, and more preferably, a copolymer of an aromatic hydrocarbon and an aliphatic hydrocarbon.

Copolymers of aromatic hydrocarbons and aliphatic hydrocarbons are commercially available, for example, from Mitsui Chemicals, Inc. under the trade name of FTR6125, and from Toho Chemical Industry Co., LTD. under the trade name of Toho High-Resin #130 and #150.

Alicyclic saturated hydrocarbon resins are commercially available, for example, from Arakawa Chemical Industries, Ltd. under the trade name of Arkon P140 and M-135.

Polymerized rosin esters are commercially available, for example, from Arakawa Chemical Industries, Ltd. under the trade name of Pensel D-125, D-135, and D-160, and Pensel KK.

Hydrogenated terpene resins are commercially available, for example, from Yasuhara Chemical Co., Ltd. under the trade name of Crealon P-125, P-135, and P-150.

Aromatic hydrocarbon resins are commercially available, for example, from Tosoh Corporation under the trade name of Petcoal 130, 140, and 150.

Rosin phenol resins are commercially available, for example, from Harima Chemicals, Inc. under the trade name of Neotall 125 and 145 PK.

As the resin having a softening point of 120° C. or more, a copolymer resin of an aromatic hydrocarbon and an aliphatic hydrocarbon is particularly preferable. This is because it has good compatibility with the acid group-containing styrene-butadiene base rubber which constitutes a base. At a styrene portion, a butadiene portion and a portion where a butadiene portion is hydrogenated, since an aromatic hydrocarbon resin has good compatibility with the styrene portion, which is high in polarity, and an aliphatic hydrocarbon resin has good compatibility with the butadiene portion and the hydrogenated butadiene portion, which are low in polarity, it is presumed that a resin in which an aliphatic and an aromatic are copolymerized has excellent compatibility with both of the high polar portion and the low polar portion.

The coating agent in the present invention comprises 10 to 100 parts by weight, more preferably 10 to 70 parts by weight of the resin having a softening point of 120° C. or more, with respect to 100 parts by weight of the acid group-containing styrene-butadiene base rubber.

While the organic solvent in the present invention is not particularly limited as long as it is an organic solvent or a mixture of organic solvents capable of dissolving the acid group-containing styrene-butadiene base rubber and the resin having a softening point of 120° C. or more, a non-halogen solvent is preferable. The organic solvent in the present invention is preferably a mixture of two or more organic solvents. Mixing two or more organic solvents makes it easy to control solubility, viscosity and drying speed.

As for the designing of a solvent, Du Pont has introduced a method of dissolving a chloroprene rubber using a correlation chart between hydrogen bond indexes and solubility parameters. By applying this method to styrene-butadiene base rubbers, it is possible to obtain a mixed solvent having a desired hydrogen bond index and solubility parameter value. While a method of designing a solvent for a polymer from a solubility parameter has long been known, a solubility parameter alone has been proved to be insufficient since solvents of an identical solubility parameter can largely differ in terms of chemical species and dissolving power. Du Pont has classified various solvents into high polar solvents, medium polar solvents, and low polar solvents according to their hydrogen bond strength, and rated a low polar solvent having a low hydrogen bond strength as 1, and a high solvent as 10, and presented them as hydrogen bond indexes. Using the hydrogen bond indexes and solubility parameter values, a solvent having desired values can be obtained by plotting or calculation, which is also described in the "Dictionary of Adhesives (Settyaku-hyakka)". For example, the calculation method of the hydrogen bond indexes and solubility parameters for three components, Solvents A, B, and C are as shown in Table 1. In addition, the hydrogen bond indexes and solubility parameters of typical organic solvents are shown in Table 2.

Furthermore, solubility parameters and hydrogen bond indexes not only determine the solubility of polymers, but also affect the viscosity of coating agents obtained by dissolving them. The solvent-type adhesive (coating agent) of acid group-containing styrene-butadiene base rubber generally has an extremely high viscosity at low temperatures. However, by suitably selecting the hydrogen bond index and solubility parameter, it is possible to reduce such problems. As the hydrogen bond index, for example, 2.3 to 3.8, and particularly 2.3 to 3.5 can be mentioned, and as the solubility parameter, for example, 7.9 to 8.9, particularly 8.3 to 8.7 can be mentioned.

TABLE 1

|  | Hydrogen bond index | Solubility parameter | Blending amount (Volume) |
|---|---|---|---|
| Solvent A | $\gamma_A$ | $\delta_A$ | $V_A$ |
| Solvent B | $\gamma_B$ | $\delta_B$ | $V_B$ |
| Solvent C | $\gamma_C$ | $\delta_C$ | $V_C$ |
| Mixture of Solvents A, B, and C | $\gamma$ | $\delta$ | V |

$\gamma = (\gamma_A * V_A / V) + (\gamma_B * V_B / V) + (\gamma_C * V_C / V)$
$\delta = (\delta_A * V_A / V) + (\delta_B * V_B / V) + (\delta_C * V_C / V)$

TABLE 2

| Solvent name | Solubility parameter | Hydrogen bond index | Specific gravity |
|---|---|---|---|
| Cyclohexane | 8.2 | 2.2 | 0.778 |
| n-Hexane | 7.3 | 2.1 | 0.659 |
| Methyl ethyl ketone | 9.3 | 5.4 | 0.804 |
| Acetone | 10 | 5.9 | 0.789 |
| Methanol | 14.5 | 10 | 0.792 |
| Ethyl acetate | 9.1 | 5.2 | 0.902 |
| Isopropyl acetate | 8.4 | 5.5 | 0.870 |
| Methylcyclohexane | 7.8 | 2.5 | 0.769 |

Figure 1:
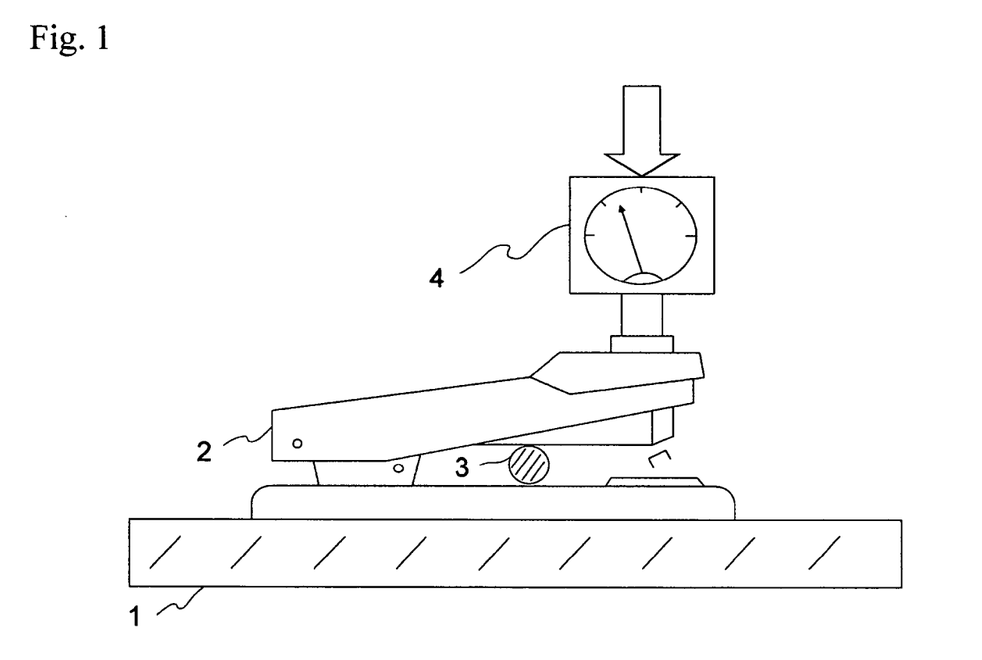
FIG. 1 is a schematic view of a test apparatus for the shearing test of a metallic staple.

It is preferred that staples to which the coating agent in the present invention is applied to adhere them to each other have a measurement value in the shearing test of 10 to 40 N. When it is 10 N or less, attached staples separate from each other at the time of packaging or during the course of distribution, and, on the other hand, when it is 40 N or more, adhesion between metallic materials is too strong to easily separate them one by one. In the staple shearing test, a string of staples No. 10 for a stapler as defined in JIS S 6036 (Strip of staples for stapler) is prepared, a force is applied from directly above to one of the staples in the same way as in actual use, and measure the force required to separate one staple (FIG. 1).

Figure 2:
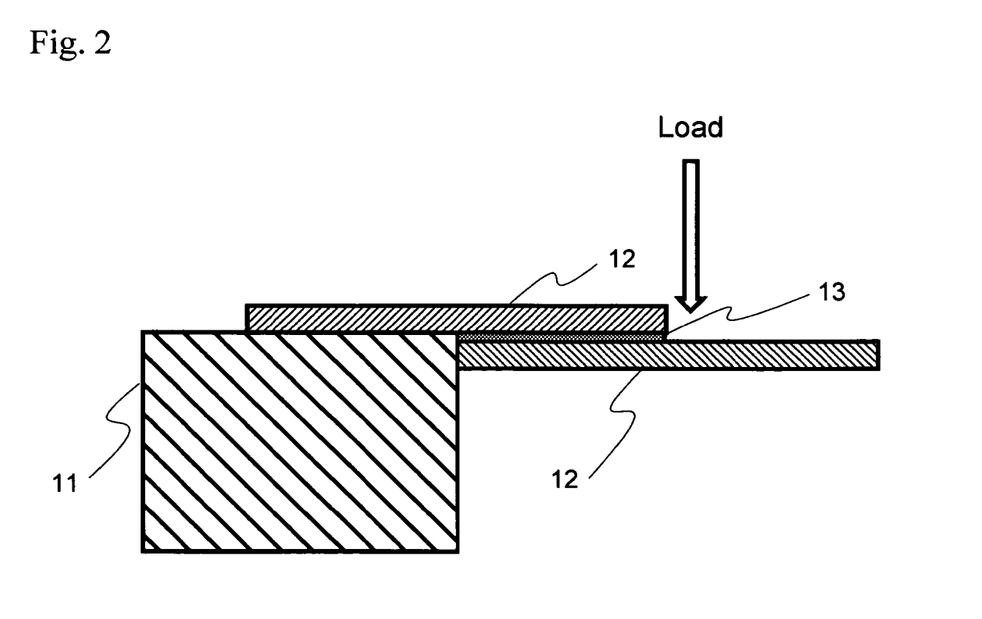
FIG. 2 is a schematic view of a blocking test apparatus of a metallic staple.

It is desirable that the coating agent in the present invention has a numerical value in the blocking test of 50 N or less, particularly 15 N or less. In the production of staples, during the production process (to be described later), adhered materials are wound by a bobbin, and then the wound materials are disentangled when they are formed into the shape of "U" in the next step. Here, if the numerical value of the coating agent is 50 N or more, the adhered materials in the form of a belt can fracture when they are disentangled, causing process failure. Or, otherwise, strings of staples each formed into the shape of "U" stick to each other, or to their package boxes at the distribution stage. Such problems could also occur in the case of pin nails and finish nails. In the blocking test, the coating agent is applied with a bar coater #70 to each of two iron plates having a width of 25 mm, a length of 100 mm, and a thickness of 1.6 mm, and the iron plates are left under the condition of 23±2° C. for 24 hours. The surfaces to which the coating agent is applied are then overlaid one on another in the length of 50 mm, held with a clip, kept under the condition of 50±2° C. for 3 hours, and cooled under the condition of 23±2° C. for one hour, and they are ready for the measurement of adhesion strength at the rate of 200 mm/min according to the method of FIG. 2.

Since neither halogen nor halogen compound is an essential component of the coating agent in the present invention, the coating agent can be produced as a composition free from them, and such coating agent is environmentally particularly preferable.

Figure 3:
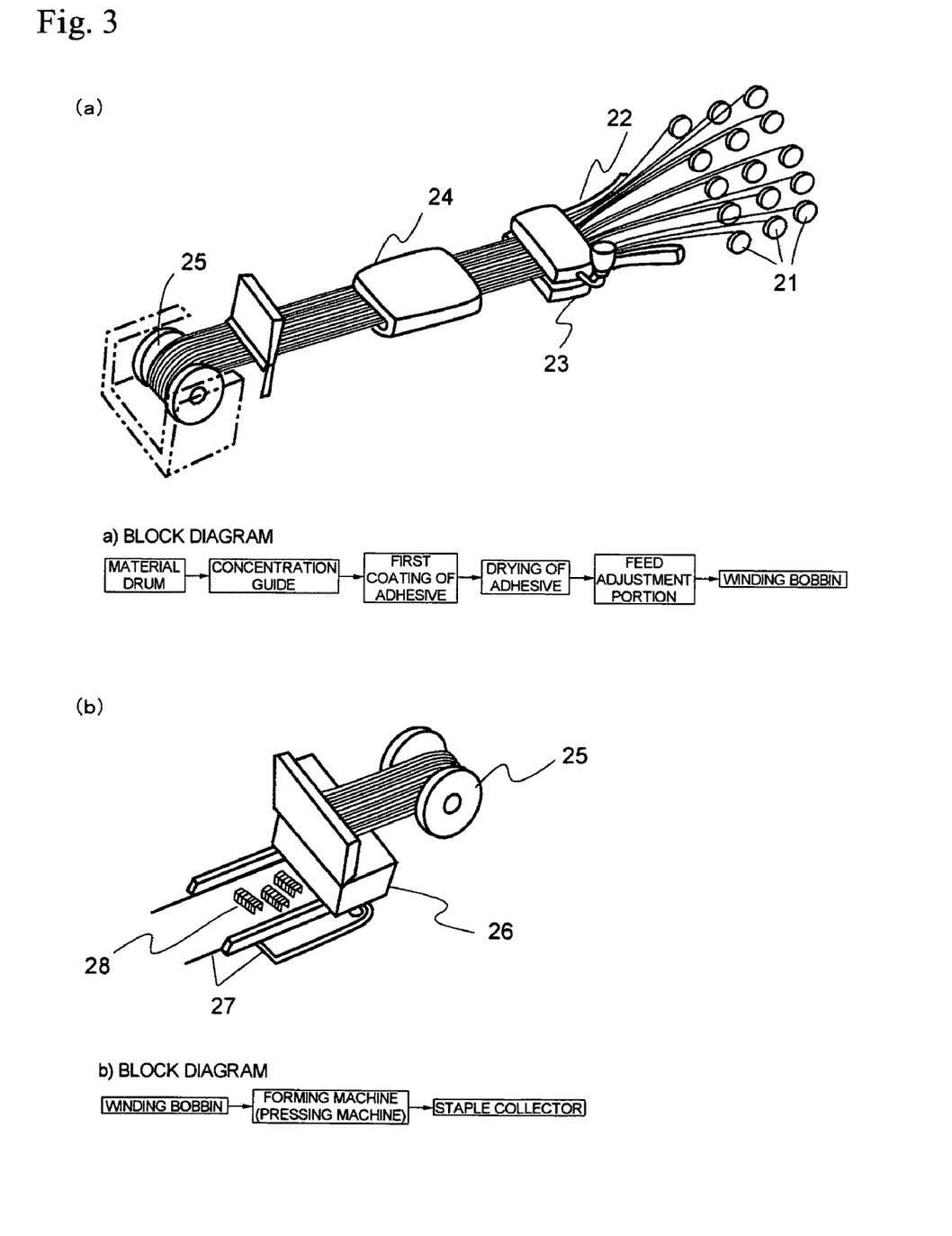
FIG. 3 is a schematic view of a manufacture method of a metallic staple.

Regarding the production of metallic staples, there is a method of concentrating a number of wire rods, adhering them to each other with the coating agent of the present invention, and continuously introducing them to a "U" shape forming machine (staple processing machine), a method of once winding up the adhered materials, and then shaping the resultant wound materials using various kinds of forming machines. The latter method is efficient in producing multiple types of staples. The production process of this method consists of two steps, a and b as shown in FIG. 3. In Step a, staple materials wound on material drums are concentrated according to the number of staples to be attached to each other, and guided to the coating applicator of the coating agent. The guided staple materials pass through the coating applicator in a horizontal state, not overlapping with each other, and coated with the adhesive between respective adjacent staple materials and on the top and bottom surfaces thereof. The staple materials to which the adhesive is coated are then fed to the next dryer to be dried and hardened. The dried and hardened staple materials are cut off such that they are wound up by a bobbin for a suitable wound length. In this manner, a bobbin of staple materials adhered to each other for a predetermined length is obtained. In Step b, staple materials are wound off from the bobbin, and then formed into the shape of "U" by a forming machine (staple processing machine), and then cut off.

While the explanation above is made using staples as an example, a strip of pin nails or finish nails adhered to each other is obtained by adhering respective nails to each other in the same manner as a strip of staples adhered to each other in the form of a flat plate before it is formed into the shape of "U" by a forming machine (staple processing machine), and then forming a tip end portion to be hammered in at one side end of the strip of pin nails or finish nails adhered to each other, and a head portion to be hammered on at the other side end with a processing machine for nail production having a press function.

EXAMPLE

The present invention will be explained in more details by way of Examples below.

Preparation of the Coating Agent

Example 1

To an organic solvent mixture comprising 108 parts by weight of cyclohexane, 36 parts by weight of n-hexane, 95 parts by weight of methyl ethyl ketone, and 35 parts by weight of acetone in a container of stainless steel were added while stirring 100 parts by weight of Taftech M1913 (a maleic anhydride addition product of a hydrogenated copolymer of styrene and butadiene, manufactured by Asahi Kasei Chemicals Corporation: acid value 10; styrene content: 30% by weight), and 10 parts by weight of FTR 6125 (a copolymer of an aromatic hydrocarbon and an aliphatic hydrocarbon, manufactured by Mitsui Chemicals, Inc.; softening point: 125° C.), followed by stirring for 3 hours to dissolve them to prepare a coating agent.

Examples 2 to 9 and Comparative Examples 3 to 10

In the same manner as Example 1, Taftech M1913, and resins listed in Tables 3 and 4 were dissolved in an organic solvent mixture listed in the Tables in the same manner as Example 1 to prepare a coating agent. It should be noted that Arkon M100 and Arkon P140 are aliphatic saturated hydrocarbon resins; Toho High Resin #90, Toho High Resin 130, and Toho High Resin 150 are copolymerized resins of an aliphatic hydrocarbon and an aromatic hydrocarbon; Pensel KK is a polymerized rosin ester; Crealon M115 is a hydrogenated terpene resin; Petocoal LX is an aromatic hydrocarbon resin; and Neotall 145 PK is a rosin phenol resin.

Comparative Example 1

A coating agent was prepared in the same way as Example 2 except that in place of Taftech M1913, Asapren T-411 (a block rubber of a styrene-butadiene copolymer in which the content of styrene containing no acid group is 30% by weight, manufactured by Asahi Kasei Chemicals Corporation) was used.

Comparative Examples 2

A coating agent was prepared in the same way as Example 2 except that in place of Taftech M1913, Tafpren A (a block rubber of a styrene-butadiene copolymer in which the content of styrene containing no acid group is 40% by weight, manufactured by Asahi Kasei Chemicals Corporation) was used.

Comparative Examples 11

A coating agent was prepared using Nipol 1001 (acrylonitrile butadiene rubber containing no acid group, manufactured by Zeon Corporation) in place of Taftech M1913 and according to the formulation given in Table 4.

Comparative Examples 12

A coating agent was prepared using Nipol 1072 (acrylonitrile butadiene rubber containing an acid group, manufactured by Zeon Corporation) in place of Taftech M1913 and according to the formulation given in Table 4.

(Production of Metallic Staples and Performance Test)
(Production of Metallic Staples)

Strips of staples No. 10 for a stapler as defined in JIS S 6036 (Strip of staples for stapler) were produced using the coating agents of Examples 1 to 9 and Comparative Examples 1 to 12 as described in Tables 3 and 4 in the manner as explained above.

(Performance Test)

A softening point test, peeling adhesion strength test, blocking resistance test, and coating film flexibility test on the coating agents of Example 1 to 9 and Comparative Examples 1 to 12 as listed in Tables 3 and 4, as well as a shearing test on staples No. 10 that were produced using the coating agents of Examples 1 to 9 and Comparative Examples 1 to 12 as listed in Tables 3 and 4, were conducted as follows.

Softening point test: in accordance with JIS K 6833, each of the coating agents was applied on two pieces of cotton sail cloths with a glass rod, and after drying, the coating agent was applied again to seal-treat the cotton sail cloths, the coating agent was applied for the third time, and immediately after that, the respective two pieces of cloths on which the same coating agent was applied were bonded together under pressure for 12 hours, thereafter released from pressure, and left standing at room temperature for 6 days. They were cut so as to have an adhesion area of 25 mm×25 mm, from which a weight of 500 g was suspended and left at 38° C. for 15 minutes, and the temperature was increased at a gradient of 2° C. per 5 minutes, and the temperature at which the weight fell down was measured. Ratings were made as follows: a circle signifies 90° C. or more; a triangle signifies 85 to 90° C.; and a cross signifies 85° C. or less.

Peeling adhesion strength test: each of the coating agents was applied twice on a cotton sail cloth to seal-treat the cloth beforehand in the same way as in the softening point test, and then the coating agent was applied with a glass rod for the third time. Meanwhile, each of the coating agents was applied on a galvanized steel plate with a bar coater #70, thereafter the cloth and the steel plate on which the same coating agent was applied were immediately bonded together under pressure for 12 hours, then released from pressure, and left standing at room temperature for 6 days, and 180 degree-peeling adhesion strength was measured at a tensile rate of 200 mm/min under the atmosphere of 23±2° C. Ratings were made as follows: a double circle signifies 1.5 kN/m or more; a circle signifies 1.2 to 1.5 kN/m; and a cross signifies 1.2 kN/m or less.

Blocking resistance test: the test method is as previously described. Ratings were made as follows: a double circle signifies 15 N or less; a circle signifies 15 to 50 N; and a cross signifies 50 N or more.

Staple shearing test: the test method is as previously described. Ratings were made as follows: a circle signifies 10 to 40 N; and a cross signifies less than 10 or more than 40.

Coating film flexibility test: coating agents were applied on an release paper with a 400μ applicator, and cured at 23±2° C. for 7 days to form a coating film of the respective coating agents, cut into a width of 25 mm, and folded at 180 degree, and the folding line was pressed in such a way as to fold an origami, and was open again to its original state, and whether a crack or a break occurs at the folding line was observed. Ratings were made as follows: a circle signifies no cracks or breaks, and a cross signifies some cracks or breaks observed.

Overall Evaluation: Ratings were made as follows: a circle signifies that there is no cross regarding all the test items; and a cross signifies that there is one or more crosses in the test items.

Tables 3 and 4 show the results of performance evaluation. It should be noted that the hydrogen bond indexes and solubility parameters of the solvent mixtures in the Tables were those calculated from the numerical values of the respective hydrogen bond indexes and solubility parameters of the solvents in Table 2.

TABLE 3

|  | Softening point of Resin | Example 1 | Example 2 | Example 3 | Example 4 | Example 5 | Example 6 | Example 7 | Example 8 | Example 9 |
|---|---|---|---|---|---|---|---|---|---|---|
| FTR6125 | 125° C. | 10 | 50 | 100 | | | | | | |
| Arkon M100 | 100° C. | | | | | | | | | |
| Arkon P140 | 140° C. | | | | 50 | | | | | |
| Toho High-Resin #90 | 95° C. | | | | | | | | | |
| Toho High-Resin 130 | 130° C. | | | | | 50 | | | | |
| Toho High-Resin 150 | 147° C. | | | | | | 50 | | | |
| Pensel KK | 165° C. | | | | | | | | 50 | 10 |
| Crealon M115 | 115° C. | | | | | | | | | |
| Petocoal LX | 100° C. | | | | | | | | | |
| Neotall 145PK | 140° C. | | | | | | | | 50 | |
| Asapren T411 | Content of styrene 30% | | | | | | | | | |
| Tafpren A | Content of styrene 40% | | | | | | | | | |
| Taftech M1913 | Content of styrene having acid group 30% | 100 | 100 | 100 | 100 | 100 | 100 | 100 | 100 | 100 |
| Nipol 1001 | NBR | | | | | | | | | |
| Nipol 1072 | NBR having acid group | | | | | | | | | |
| Cyclohexane | | 108 | 140 | 147 | 140 | 140 | 140 | 140 | 140 | 108 |
| n-hexane | | 36 | 45 | 48 | 45 | 45 | 45 | 45 | 45 | 36 |
| MEK | | 95 | 122 | 130 | 122 | 122 | 122 | 122 | 122 | 95 |
| Acetone | | 35 | 45 | 48 | 45 | 45 | 45 | 45 | 45 | 35 |
| Total | | 384 | 503 | 574 | 503 | 503 | 503 | 503 | 503 | 384 |
| Viscosity (Unit: mPa·s/23° C.) | | 7650 | 2800 | 4200 | 1050 | 3600 | 4550 | 5100 | 2260 | 8250 |
| Solubility parameter | | 8.66 | 8.66 | 8.66 | 8.66 | 8.66 | 8.66 | 8.66 | 8.66 | 8.66 |
| Hydrogen bond index | | 3.71 | 3.71 | 3.71 | 3.71 | 3.71 | 3.71 | 3.71 | 3.71 | 3.71 |
| Softening point | ° C. | 93 | 102 | 102 | 87 | 101 | 112 | 99 | 98 | 95 |
| (Seven days after adhesion) | Rating | ○ | ○ | ○ | Δ | ○ | ○ | ○ | ○ | ○ |
| Peeling adhesion strength (Zn steel plate/sail cloth) | KN/m | 1.96 | 2.23 | 1.84 | 1.25 | 1.80 | 2.12 | 1.25 | 1.41 | 1.29 |
| | Rating | ⊚ | ⊚ | ⊚ | ○ | ⊚ | ⊚ | ○ | ○ | ○ |
| Staple shearing test | N | 16 | 28 | 36 | 13 | 30 | 32 | 30 | 24 | 21 |
| | Rating | ○ | ○ | ○ | ○ | ○ | ○ | ○ | ○ | ○ |
| Blocking test (iron plate/iron plate) | N | 33.0 | 7.8 | 2.7 | 48.4 | 12.3 | 17.1 | 13.8 | 11.3 | 6.5 |
| | Rating | ○ | ⊚ | ⊚ | ○ | ⊚ | ○ | ⊚ | ⊚ | ⊚ |
| Flexibility of coating film | Rating | ○ | ○ | ○ | ○ | ○ | ○ | ○ | ○ | ○ |
| Overall evaluation | | ○ | ○ | ○ | ○ | ○ | ○ | ○ | ○ | ○ |

TABLE 4

|  | Softening point of Resin | Comparative example 1 | Comparative example 2 | Comparative example 3 | Comparative example 4 | Comparative example 5 | Comparative example 6 |
|---|---|---|---|---|---|---|---|
| FTR 6125 | 125° C. | 50 | 50 | | | | |
| Arkon M100 | 100° C. | | | 50 | | | |
| Arkon P140 | 140° C. | | | | | | |
| Toho High-Resin #90 | 95° C. | | | | 50 | | |
| Toho High-Resin 130 | 130° C. | | | | | | |
| Toho High-Resin 150 | 147° C. | | | | | | |
| Pensel KK | 165° C. | | | | | | |
| Crealon M115 | 115° C. | | | | | 50 | |
| Petocoal LX | 100° C. | | | | | | 50 |
| Neotall 145PK | 140° C. | | | | | | |
| Asapren T411 | Content of Styrene 30% | 100 | | | | | |
| Tafpren A | Content of Styrene 40% | | 100 | | | | |
| Taftech M1913 | Content of Styrene having acid group 30% | | | 100 | 100 | 100 | 100 |
| Nipol 1001 | NBR | | | | | | |
| Nipol 1072 | NBR having acid group | | | | | | |
| Cyclohexane | | 140 | 140 | 140 | 140 | 140 | 140 |

TABLE 4-continued

| | | | | | | | |
|---|---|---|---|---|---|---|---|
| n-hexane | | 45 | 45 | 45 | 45 | 45 | 45 |
| MEK | | 122 | 122 | 122 | 122 | 122 | 122 |
| Acetone | | 45 | 45 | 45 | 45 | 45 | 45 |
| Total | | 503 | 503 | 503 | 503 | 503 | 503 |
| Viscosity (Unit: mPa·s/23° C.) | | 6500 | 163 | 850 | 1980 | 950 | 3820 |
| Solubility parameter | | 8.66 | 8.66 | 8.66 | 8.66 | 8.66 | 8.66 |
| Hydrogen bond index | | 3.71 | 3.71 | 3.71 | 3.71 | 3.71 | 3.71 |
| Softening point (Seven days after adhesion) | ° C. | 96 | 77 | 79 | 86 | 81 | 80 |
| | Rating | ○ | X | X | Δ | X | X |
| Peeling adhesion strength (Zn steel plate/sail cloth) | KN/m | 1.14 | 1.45 | 0.94 | 0.94 | 0.98 | 1.45 |
| | Rating | X | ○ | X | X | X | ○ |
| Staple shearing test | N | 7 | 20 | 12 | 28 | 16 | 21 |
| | Rating | X | ○ | ○ | ○ | ○ | ○ |
| Blocking test (iron plate/iron plate) | N | 30.9 | 68.7 | 57.9 | 42.7 | 53.1 | 18.8 |
| | Rating | ○ | X | X | ○ | X | ○ |
| Flexibility of coating film | Rating | ○ | ○ | ○ | ○ | ○ | ○ |
| Overall evaluation | | X | X | X | X | X | X |

| | Softening point of Resin | Comparative example 7 | Comparative example 8 | Comparative example 9 | Comparative example 10 | Comparative example 11 | Comparative example 12 |
|---|---|---|---|---|---|---|---|
| FTR 6125 | 125° C. | 5 | 120 | | | 50 | 50 |
| Arkon M100 | 100° C. | | | | | | |
| Arkon P140 | 140° C. | | | | | | |
| Toho High-Resin #90 | 95° C. | | | | | | |
| Toho High-Resin 130 | 130° C. | | | | | | |
| Toho High-Resin 150 | 147° C. | | | | | | |
| Pensel KK | 165° C. | | | 5 | 120 | | |
| Crealon M115 | 115° C. | | | | | | |
| Petocoal LX | 100° C. | | | | | | |
| Neotall 145PK | 140° C. | | | | | | |
| Asapren T411 | Content of Styrene 30% | | | | | | |
| Tafpren A | Content of Styrene 40% | | | | | | |
| Taftech M1913 | Content of Styrene having acid group 30% | 100 | 100 | 100 | 100 | | |
| Nipol 1001 | NBR | | | | | 100 | |
| Nipol 1072 | NBR having acid group | | | | | | 100 |
| Cyclohexane | | 108 | 147 | 108 | 157 | 140 | 140 |
| n-hexane | | 36 | 48 | 36 | 48 | | |
| MEK | | 95 | 130 | 95 | 130 | 202 | 202 |
| Acetone | | 35 | 48 | 35 | 48 | 10 | 10 |
| Total | | 380 | 594 | 380 | 603 | 503 | 503 |
| Viscosity (Unit: mPa·s/23° C.) | | 7000 | 4450 | 7700 | 15000 | 14000 | 2800 |
| Solubility parameter | | 8.66 | 8.66 | 8.66 | 8.66 | 8.87 | 8.87 |
| Hydrogen bond index | | 3.71 | 3.71 | 3.71 | 3.71 | 4.12 | 4.12 |
| Softening point (Seven days after adhesion) | ° C. | 89 | 101 | 92 | Below 38 | Below 38 | Below 38 |
| | Rating | Δ | ○ | ○ | X | X | X |
| Peeling adhesion strength (Zn steel plate/sail cloth) | KN/m | 1.22 | 1.57 | 1.47 | 0.80 | — | 0.41 |
| | Rating | ○ | ⊚ | ○ | X | — | X |
| Staple shearing test | N | 15 | 35 | 5 | 9 | — | 0 |
| | Rating | ○ | ○ | X | X | — | X |
| Blocking test (iron plate/iron plate) | N | 69.9 | 0.0 | 19.7 | 0.0 | | 74.6 |
| | Rating | X | ⊚ | ○ | ⊚ | | X |
| Flexibility of coating film | Rating | ○ | X | ○ | ○ | | ○ |
| Overall evaluation | | X | X | X | X | X | X |

Examples 10 to 19 and Comparative Examples 13 to 15

The coating agents of Examples 10 to 19 and Comparative Examples 13 to 15 were prepared in the same manner as Example 2 according to the solvent formulations as given in Tables 5 and 6. As for the formulations in which viscosity is predicted to be low, some adjustment of nonvolatile contents was made.

It should be noted that the hydrogen bond indexes and solubility parameters of the solvent mixtures in the Tables were calculated from the respective numerical values of hydrogen bond indexes and solubility parameters of the solvents in Table 2.

TABLE 5

| | Example 10 | Example 11 | Example 12 | Example 13 | Example 14 | Example 15 | Example 16 | Example 17 | Example 18 | Example 19 |
|---|---|---|---|---|---|---|---|---|---|---|
| Cyclohexane | 268 | 236 | 239 | 234 | 292 | 270 | 262 | 286 | 251 | 237 |
| Acetone | 54 | | | 74 | 87 | 81 | 110 | | | |
| Isopropyl acetate | 12 | 6 | 45 | 71 | | 28 | 7 | | | |
| MEK | | 92 | 96 | | | | | | | 142 |
| IPA | | | | | | | | 64 | | |
| Ethyl acetate | | | | | | | | | | |
| n-hexane | | | | | | | | | 128 | |
| Methanol | | | | | | | | | 10 | |
| *FTR6125 | 50 | 50 | 50 | 50 | 50 | 50 | 50 | 50 | 50 | 50 |
| Taftech M1913 | 100 | 100 | 100 | 100 | 100 | 100 | 100 | 100 | 100 | 100 |
| Total | 484 | 484 | 530 | 529 | 529 | 529 | 529 | 500 | 539 | 529 |
| Nonvolatile contents (%) | 31.0 | 31.0 | 28.3 | 28.4 | 28.4 | 28.4 | 28.4 | 30.0 | 27.8 | 28.4 |
| Viscosity 23° C. (mPa·S) | 1000 | 840 | 540 | 775 | 570 | 593 | 888 | 1150 | 360 | 525 |
| Solubility parameter | 8.50 | 8.50 | 8.50 | 8.59 | 8.61 | 8.60 | 8.72 | 8.80 | 8.02 | 8.60 |
| Hydrogen bond index | 2.90 | 3.12 | 3.36 | 3.49 | 3.04 | 3.21 | 3.32 | 3.38 | 2.36 | 3.37 |

TABLE 6

| | Comparative example 13 | Comparative example 14 | Comparative example 15 |
|---|---|---|---|
| Cyclohexane | | 50 | |
| Acetone | | | |
| Isopropyl acetate | | | |
| MEK | | 346 | 380 |
| IPA | | | |
| Ethyl acetate | 380 | | |
| n-hexane | | | |
| Methanol | | | |
| *FTR6125 | 50 | 50 | 50 |
| Taftech M1913 | 100 | 100 | 100 |
| Total | 530 | 546 | 530 |
| Nonvolatile contents | 28.3 | 27.5 | 28.3 |
| Viscosity 23° C. (mPa·S) | Insoluble | Insoluble | Insoluble |
| Solubility parameter | 9.10 | 9.16 | 9.30 |
| Hydrogen bond index | 5.20 | 4.98 | 5.40 |

INDUSTRIAL APPLICABILITY

In the present invention, by using a specific coating agent, it is possible to provide metallic staples in which no halogenated substance, as represented by a vinyl chloride resin, is required at all, while achieving performance equivalent to or better than that of the conventional metallic staples using a conventional coating agent, as well as improved blocking resistance, which used to be insufficient with the conventional products, thereby the productivity can be enhanced, and environmental load can be reduced.

EXPLANATION OF REFERENCE NUMERALS

| 1: | Fixed base |
|---|---|
| 2: | Stapler |
| 3: | Stopper |
| 4: | Stress meter |
| 11: | Fixed base |
| 12: | Steel plate |
| 13: | Coating agent |
| 21: | Material drum |
| 22: | Concentration guide |
| 23: | Coating, applicator |
| 24: | Dryer |
| 25: | Winding bobbin |
| 26: | Staple processing machine |
| 27: | Belt |
| 28: | Strip of staples |

The invention claimed is:

1. A strip of fasteners adhered to each other in which a plurality of metallic fastener materials are aligned, wherein a coating agent for adhering adjacent metallic fastener materials to each other comprises 100 parts by weight of an acid group-containing styrene-butadiene base rubber and 10 to 100 parts by weight of a resin having a softening point of 120° C. or more, each of the acid-group containing styrene-butadiene base rubber and the resin being dissolved in an organic solvent.

2. The strip of fasteners adhered to each other according to claim 1, wherein the resin in the coating agent having a softening point of 120° C. or more is a copolymerized resin of an aromatic hydrocarbon and an aliphatic hydrocarbon.

3. The strip of fasteners adhered to each other according to claim 1, wherein the coating agent has a numerical value in a staple shearing test of 10 to 40 N.

4. The strip of fasteners adhered to each other according to claim 1, wherein the coating agent has numerical value in a blocking test of 50 N or less.

5. The strip of fasteners adhered to each other according to claim 1, wherein the coating agent does not contain a halogen or a halogen compound.

6. The strip of fasteners adhered to each other according to claim 1, which is a strip of staples adhered to each other.

7. The strip of fasteners adhered to each other according to claim 1, which is a strip of staples adhered to each other operable for use in a stationary stapler.

8. A strip of fasteners adhered to each other in which a plurality of metallic fastener materials are aligned, wherein a coating agent for adhering adjacent metallic fastener materials to each other comprises 100 parts by weight of an acid group-containing styrene-butadiene base rubber and 10 to 100 parts by weight of a resin having a softening point of 120° C. or more, each of the acid-group-containing styrene-butadiene base rubber and the resin being dissolved in an organic solvent; the resin in the coating agent having softening point of 120° C. or more is a copolymerized resin of an aromatic hydrocarbon and an aliphatic hydrocarbon; the coating agent has a numerical value in a staple shearing test of 10 to 40 N and a numerical value in a blocking test of 50 N or less; the coating agent does not contain a halogen or a halogen compound; the acid group-containing styrene-butadiene base rubber is an addition product of maleic anhydride with a copolymer of a styrene derivative and butadiene or an addition product of maleic anhydride with a hydrogenated copolymer of styrene and butadiene; the acid value of the acid group-containing styrene-butadiene base rubber is 5 to 15; and the styrene in the acid group-containing styrene-butadiene base rubber is in an amount of 20 to 40% by weight.

9. The strip of fasteners adhered to each other according to claim 8, which is a strip of staples adhered to each other.

10. The strip of fasteners adhered to each other according to claim 8, which is a strip of staples adhered to each other is operable for use in a stationary stapler.

* * * * *